United States Patent
Huh et al.

(10) Patent No.: US 8,081,754 B2
(45) Date of Patent: Dec. 20, 2011

(54) KEY UPDATE METHOD AND APPARATUS THEREOF

(75) Inventors: Mi Suk Huh, Suwon-si (KR); Dae Youb Kim, Seoul (KR); Hwan Joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 893 days.

(21) Appl. No.: 11/802,007

(22) Filed: May 18, 2007

(65) Prior Publication Data

US 2008/0120329 A1    May 22, 2008

(30) Foreign Application Priority Data

Nov. 16, 2006  (KR) .................. 10-2006-0113398

(51) Int. Cl.
*H04L 9/00* (2006.01)
*H04L 9/08* (2006.01)
*H04L 29/06* (2006.01)
*H04L 9/32* (2006.01)
*H04K 1/00* (2006.01)

(52) U.S. Cl. .......... 380/44; 380/255; 380/278; 380/279; 713/150; 713/168; 713/171

(58) Field of Classification Search .............. 380/44, 380/255, 278, 279; 713/150, 168, 171
See application file for complete search history.

(56) References Cited

U.S. PATENT DOCUMENTS

| 7,043,024 | B1 | 5/2006 | Dinsmore et al. | |
|---|---|---|---|---|
| 7,706,530 | B2 * | 4/2010 | Suga et al. | 380/44 |
| 2003/0204694 | A1 * | 10/2003 | Degenaro et al. | 711/164 |
| 2005/0018853 | A1 * | 1/2005 | Lain et al. | 380/277 |
| 2005/0050004 | A1 | 3/2005 | Sheu et al. | |
| 2007/0076889 | A1 * | 4/2007 | DeRobertis et al. | 380/279 |

FOREIGN PATENT DOCUMENTS

| JP | 2006-011717 | 1/2006 |
|---|---|---|
| KR | 10-2002-0078745 | 10/2002 |
| KR | 1020040107698 A | 12/2004 |
| KR | 1020060013029 A | 2/2006 |
| WO | WO 97/16938 | 5/1997 |

OTHER PUBLICATIONS

Baag, et al, "The Study of Efficient Rekey Interval Allotment for Minimum Cost on Secure Multicast" *Journal of Industrial Technology*, No. 21 A, 2001, Kangwon National University, Korea, pp. 123-128.

* cited by examiner

*Primary Examiner* — Aravind Moorthy
(74) *Attorney, Agent, or Firm* — NSIP Law

(57) ABSTRACT

A key update method and a key update apparatus are provided. The method includes storing data in a database of an update server, the data having an encoded updated node key in response to a node key update for a group; selecting necessary data, from among the data having the encoded updated node key, to calculate a key immediately prior to when the member is switched to the online mode, and generating member update data; and performing a key update with respect to the member using the member update data in a device corresponding to the member which has switched from the offline mode to the online mode.

7 Claims, 6 Drawing Sheets

KEY UPDATE METHOD AND APPARATUS THEREOF

CROSS-REFERENCE TO RELATED APPLICATION

This application claims the benefit under 35 U.S.C. §119(a) of a Korean Patent Application No. 10-2006-0113398, filed on Nov. 16, 2006, in the Korean Intellectual Property Office, the entire disclosure of which is hereby incorporated by reference.

BACKGROUND OF THE INVENTION

1. Field of the Invention

The present invention relates to a key update method and key update apparatus for updating a key of members in a group. More particularly, the present invention relates to a key update method and a key update apparatus for updating a key of a member which has switched from an offline mode to an online mode.

2. Description of Related Art

Contents which are provided to group members are typically encrypted, so that other users can not use the contents. Accordingly, all of the group members should have an encryption key, provided from a server, capable of decoding the encrypted contents.

Accordingly, updating an encryption key is an important issue. For example, when a new member joins a group, the group is required to allow the new member to restrictively access contents. Later, after the new member joins the group, when the existing group members update the encryption key, the new member may share the updated key.

Also, when one of the existing group members leaves the group, the group key, used by all group members before the leaving member leaves the group, is required to be updated so that the leaving member no longer has access to the contents.

An important issue arises with respect to providing update data, which occurs while a group member device is in an offline mode, when a member switches from the offline mode to an online mode.

Specifically, a device A is required to be able to perform a key update, which occurs during the offline mode, by effectively providing the A device with information of a key update, which occurs during the offline mode in the group in the case that the key update is performed because a new member joins the group or leaves the group while the device A is in the offline mode, and subsequently switches back from the offline mode to an online mode.

For example, in the case that two members join the group, and five members leave the group while the device A is offline, and the device A switches from the offline mode to the online mode, a key update is required to be immediately performed with respect to the two joined members and the five leaving members, occurring while the device A was in the offline mode.

Particularly, an effective key update with respect to a member switched from the offline mode to the online mode becomes an important issue as a number of group members increases, as the key update is frequently performed, and as a length of time being in the offline mode increases.

Accordingly, there is a need for an improved effective key update method and apparatus using the method are required with respect to the member switched from the offline mode the online mode.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention provides a key update method and a key update apparatus for effectively performing a key update for devices to be provided with information of an update while a device is in an offline mode.

An aspect of exemplary embodiments of the present invention also provides a key update method and a key update apparatus for effectively performing a key update using necessary update data for devices, which have switched from an offline mode to an online mode, to update their own key.

An aspect of exemplary embodiments of the present invention also provides a key update method and a key update apparatus for preventing the leaking of a group key by providing update data in an encoded form from an update server.

According to an aspect of exemplary embodiments of the present invention, there is provided a key update method including storing data in a database of an update server, the data having an encoded updated node key in response to a node key update for a group; selecting necessary data, from among the data having the encoded updated node key, to calculate a key immediately prior to when the member is switched to the online mode, and generating member update data; and performing a key update with respect to the member using the member update data in a device corresponding to the member which has switched from the offline mode to the online mode.

An aspect of exemplary embodiments of the present invention also provides that the generating of the member update data includes selecting data which corresponds to the node key update, that occur while the member is in the offline mode, from among the stored data having encoded the updated node key, and generating offline data; and selecting the necessary data for the key update with respect to the member from the offline data, and generating the member update data.

A further aspect of exemplary embodiments provides for selecting of the necessary data for the key update corresponding to the member from the offline data, and wherein generating the member update data may select the data from the offline data, the data having been encoded into a leaf node corresponding to the member or to an ancestor node key of the leaf node.

A further aspect of exemplary embodiments of the present invention provides that, the data, having the encoded updated node key, may be generated by encoding the updated node key into a child node key of the updated node.

According to another aspect of exemplary embodiments of the present invention, there is provided a key update apparatus including a database being equipped in a server, and storing data having an encoded updated node key in response to a node key update for a group; a member update data generation module for selecting necessary data, from among the data having the encoded updated node key, to calculate a key immediately prior to when the member is switched to the online mode, and generating member update data; and a key update controller for performing a key update with respect to the member by providing the member update data to a device corresponding to the member which has switched from the offline mode to the online mode.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
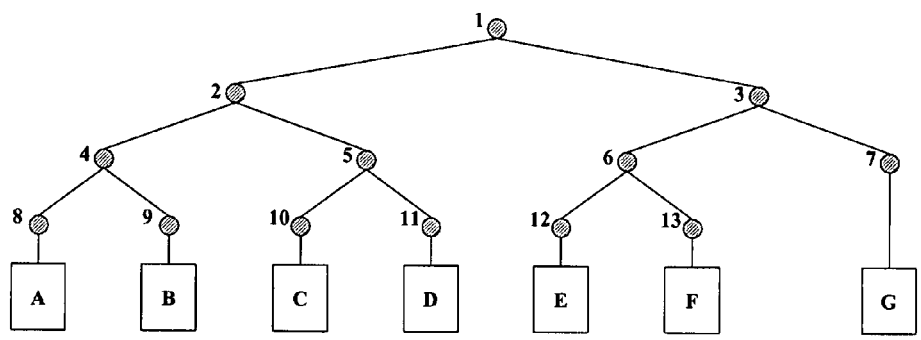
FIG. 1 is a diagram illustrating a binary tree corresponding to an example of a group according to an exemplary embodiment of the present invention.

FIG. 1 is a diagram illustrating a binary tree corresponding to an example of a group according to an exemplary embodiment of the present invention.

Referring to FIG. 1, group members A, B, C, D, E, F, and G respectively correspond to each leaf node of the binary tree.

In this case, each of the group members A, B, C, D, E, F, and G may correspond to a device or a user.

Each leaf node of the binary tree has its own encryption key.

A key of a root node is used for transmitting contents. Namely, the contents, which are transmitted from a server, are encrypted to be transmitted to the key of the root node.

In the binary tree, a key corresponding to nodes, other than the root node, is used for updating a node key. In an exemplary embodiment of the present invention, the key corresponding to nodes, other than the root node, is used for updating a key of a parent node of a corresponding node.

A key of the leaf node may be established as a member key of a corresponding member.

Each of the group members A, B, C, D, E, F, and G stores a node key of all nodes on a path from the leaf node to the root node.

Specifically, member A stores the node key of node 8, node 4, node 2 and node 1. Also, the member F stores the node key of node 13, node 6, node 3 and node 1.

Figure 2:
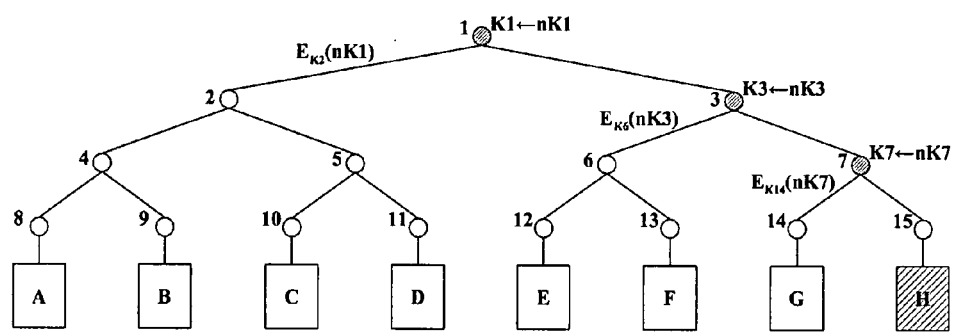
FIG. 2 is a diagram illustrating the binary tree when a new member joins the group of FIG. 1.

FIG. 2 is a diagram illustrating the binary tree when a new member joins the group of FIG. 1.

Referring to FIG. 2, node 7 is split to generate nodes 14 and 15 when a new group member H joins the group. In this case, a node corresponding to a member G changes from node 7 to node 14.

Node 15 becomes a node corresponding to the new member H.

When a new member joins the group, the split node is determined as a node, having a node ID that is a minimum or a maximum, when the binary tree is a complete binary tree. Also, when the new member joins the group, the split node is selected as a node where a depth of the leaf nodes is minimum, and is determined as a node, having a node ID that is a minimum or a maximum from the selected node, when the binary tree is not a complete binary tree.

A node key of node 15 corresponding to the new member H is established when the new member H joins the group, and node keys of all ancestor nodes 7, 3, and 1 of the node 15 are required to be updated.

Namely, as a result that the new member H joins the group, a node key of node (K1) is updated (nK1), a node key of the node (K3) is updated (nK3), and a node key of the node (K7) is updated (nK7).

Each of the group members A, B, C, D, E, F, and G requires update information corresponding to its own ancestor node. Specifically, group member G requires updated node keys of nodes 7, 3, and 1, the member A requires an updated node key of node 1, and the member E requires an updated node key of nodes 3 and 1.

In this case, the updated node keys may be encrypted to be transmitted. Specifically, the updated node key of node 1 may be encrypted to be transmitted to the member A using a node key of node 2. In this case, the member A may recover the updated node key of node 1, which has been encrypted and transmitted, since the member A has the node key of node 2.

Figure 3:
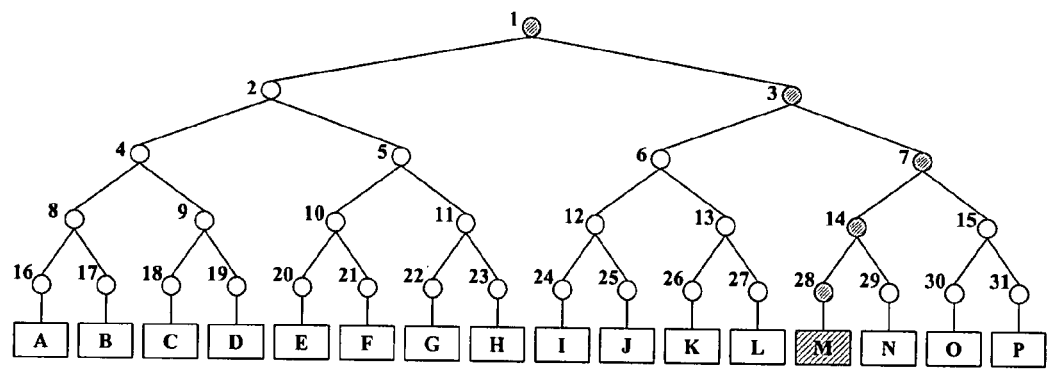
FIG. 3 is a diagram illustrating a binary tree corresponding to another example of a group according to an exemplary embodiment of the present invention.

FIG. 3 is a diagram illustrating a binary tree corresponding to another example of a group according to an exemplary embodiment of the present invention.

Referring to FIG. 3, a self-update path which connects nodes 14, 7, 3, and 1 is established when an existing member M of the group leaves the group.

Each of remaining members in the group is required to receive update information corresponding to its own ancestor node. Specifically, a member N is required to receive updated node keys of nodes 14, 7, 3, and 1, and a member D is required to receive the updated node key of the node 1.

A tree size of the binary tree corresponding to the group may vary according to a number of group members, or the tree size may be fixed regardless of the number of the group member.

Figure 4:
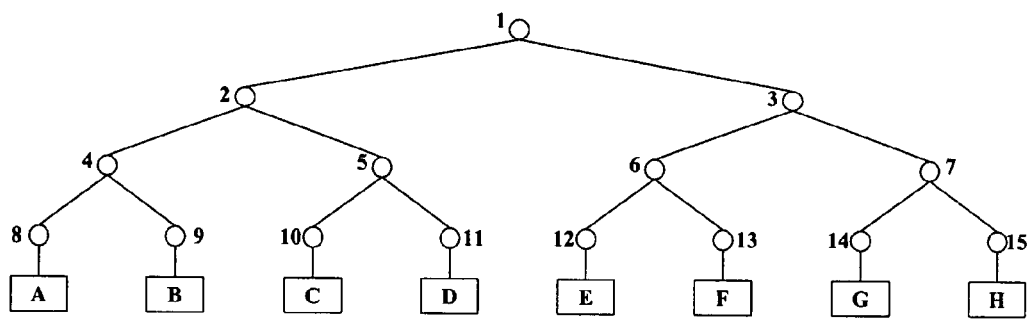
FIG. 4 is a diagram illustrating a binary tree for describing a key update method according to an embodiment of the present invention.

FIG. 4 is a diagram illustrating a binary tree for describing a key update method according to an embodiment of the present invention.

Referring to FIG. 4, each of members A through H corresponds to each of leaf nodes 8 through 15 on the binary tree.

As illustrated in FIG. 4, the member H does not receive information of a group key update while the member H is in an offline mode, and when the member H switches from the offline mode to an online mode, the key update method according to an embodiment of the present invention allows the member H to receive the information of the key update from an update server since the information of the key update had not been received during the offline mode.

Figure 5:
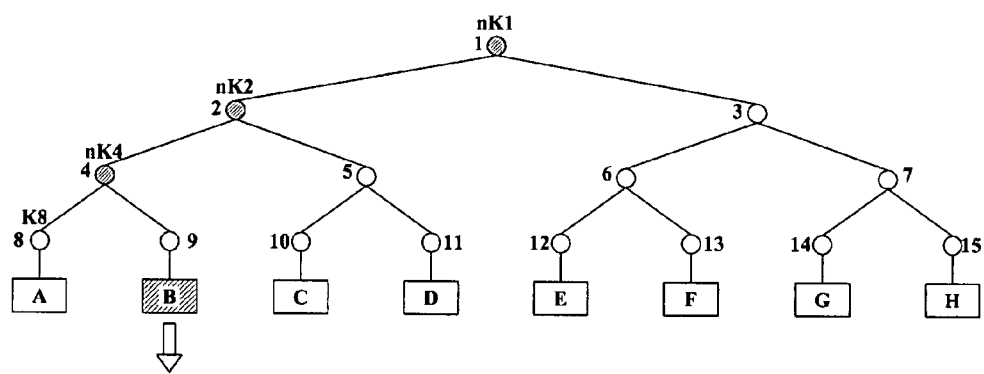
FIG. 5 is a diagram illustrating the binary tree when a first member leaves the group, corresponding to the binary tree of FIG. 4.

FIG. 5 is a diagram illustrating the binary tree when a first member leaves the group, corresponding to the binary tree of FIG. 4.

Referring to FIG. 5, when a member B leaves the group, node keys of the nodes 4, 2, and 1 are updated.

In this case, the node keys corresponding to the updated nodes 4, 2, and 1 are encrypted to be stored in a database of an update server. Herein, the encryption may be performed using a key of a child node ($E_{ki}$) of the updated nodes ($nK_i$) (i=node number).

Specifically, $E_{K3}(nK1)$, $E_{nK2}(nK1)$, $E_{nK4}(nK2)$, $E_{K5}(nK2)$, and $E_{K8}(nK4)$ are stored in the database of the update server.

As an example, when a member H switches from an offline mode to an online mode after the member B leaves the group, the member H downloads $E_{K3}(nK1)$ from the database of the update server to perform a key update. Namely, the $E_{K3}(nK1)$ becomes member update data.

As a further example, when a member A switches from an offline mode to an online mode after the member B leaves the group, the member A downloads $E_{nK2}(nK1)$, $E_{nK4}(nK2)$, and $E_{K8}(nK4)$ from the database of the update server to perform a key update. Namely, the $E_{nK2}(nK1)$, $E_{nK4}(nK2)$, and $E_{K8}(nK4)$ become member update data.

As a further example, when a member C switches from an offline mode to an online mode after the member B leaves the group, the member C downloads $E_{nK2}(nK1)$ and $E_{K5}(nK2)$ from the database of the update server to perform a key update.

As a further example, when a member D switches from an offline mode to an online mode after the member B leaves the group, the member D downloads $E_{nK2}(nK1)$ and $E_{K5}(nK2)$ from the database of the update server to perform a key update.

As a further example, when a member E switches from an offline mode to an online mode after the member B leaves the group, the member E downloads $E_{K3}(nK1)$ from the database of the update server to perform a key update.

As a further example, when a member F switches from an offline mode to an online mode after the member B leaves the group, the member F downloads $E_{K3}(nK1)$ from the database of the update server to perform a key update.

As a further example, when a member G switches from an offline mode to an online mode after the member B leaves the group, the member G downloads $E_{K3}(nK1)$ from the database of the update server to perform a key update.

Figure 6:
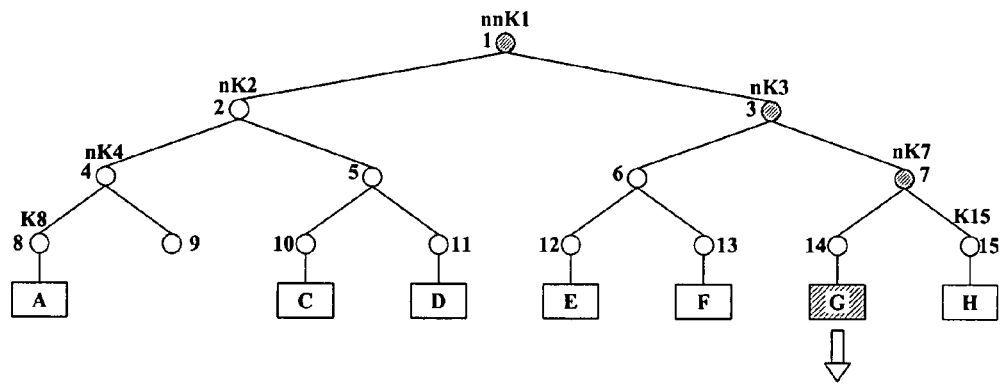
FIG. 6 is a diagram illustrating the binary tree when a second member leaves the group, corresponding to the binary tree of FIG. 5.

FIG. 6 is a diagram illustrating the binary tree when a second member leaves the group, corresponding to the binary tree of FIG. 5.

Referring to FIG. 6, when a member G leaves the group, node keys of nodes 7, 3, and 1 are updated.

In this case, the node keys corresponding to the updated nodes 7, 3, and 1 are encrypted to be stored in a database of an update server. In this case, the encryption may be performed using a key of a child node of the updated nodes.

Consequently, $E_{K3}(nK1)$, $E_{nK2}(nK1)$, $E_{nK4}(nK2)$, $E_{K5}(nK2)$, $E_{K8}(nK4)$, $E_{nK2}(nnK1)$, $E_{nK3}(nnK1)$, $E_{K6}(nK3)$, $E_{nK7}(nK3)$, and $E_{K15}(nK7)$ are stored in the database of the update server since $E_{nK2}(nnK1)$, $E_{nK3}(nnK1)$, $E_{K6}(nK3)$, $E_{nK7}(nK3)$, and $E_{K15}(nK7)$ are additionally stored in the database of the update server.

For example, when a member H switches from an offline mode to an online mode after the member G leaves the group, the member H selects $E_{nK2}(nnK1)$, $E_{nK3}(nnK1)$, $E_{K6}(nK3)$, $E_{nK7}(nK3)$, and $E_{K15}(nK7)$ from the database of the update server as offline data. Namely, the member H selects data corresponding to a node key update occurring while the member H is in an offline mode.

Later, the member H selects necessary data for updating a key update as member update data, from among the offline data of the member H. Namely, the member H selects $E_{nK3}(nnK1)$, $E_{nK7}(nK3)$, and $E_{K15}(nK7)$ as the member update data, from among $E_{nK2}(nnK1)$, $E_{nK3}(nnK1)$, $E_{K6}(nK3)$, $E_{nK7}(nK3)$, and $E_{K15}(nK7)$.

As another example, when a member A switches from an offline mode to an online mode after the member G leaves the group, the member A selects $E_{nK2}(nnK1)$, $E_{nK2}(nnK1)$, $E_{K6}(nK3)$, $E_{nK7}(nK3)$, and $E_{K15}(nK7)$ from the database of the update server as offline data. Namely, the member A selects data corresponding to a node key update occurring while the member A is in the offline mode.

Later, the member A selects necessary data for updating a key update as member update data, from among the offline data of the member A. Namely, the member A selects $E_{nK2}(nnK1)$ as the member update data.

As another example, when a member H switches from an offline mode to an online mode after the member G leaves the group, the member H selects $E_{K3}(nK1)$, $E_{nK2}(nK1)$, $E_{nK4}(nK2)$, $E_{K5}(nK2)$, $E_{K8}(nK4)$, $E_{nK2}(nnK1)$, $E_{nK3}(nnK1)$, $E_{K6}(nK3)$, $E_{nK7}(nK3)$, and $E_{K15}(nK7)$ from the database of the update server as offline data. Namely, the member H selects data corresponding to a node key update occurring while the member H is in the offline mode.

Later, the member H selects necessary data for updating a key update as member update data, from among the offline data of the member H. Namely, the member H selects $E_{K3}(nK1)$, $E_{nK3}(nnK1)$, $E_{nK7}(nK3)$, and $E_{K15}(nK7)$ as the member update data, from among $E_{K3}(nK1)$, $E_{nK2}(nK1)$, $E_{nK4}(nK2)$, $E_{K5}(nK2)$, $E_{K8}(nK4)$, $E_{nK2}(nnK1)$, $E_{nK3}(nnK1)$, $E_{K6}(nK3)$, $E_{nK7}(nK3)$, and $E_{K15}(nK7)$.

After the member update data are determined, devices corresponding to the members perform the key update using the member data.

Figure 7:
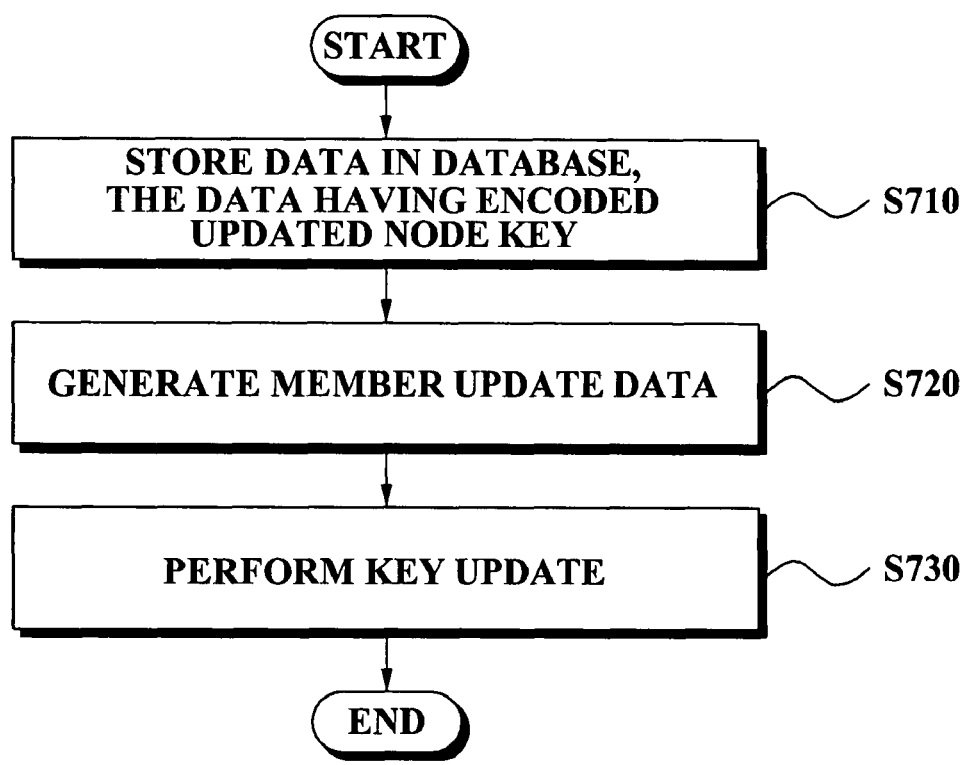
FIG. 7 is a flowchart illustrating operation of a key update method according to an embodiment of the present invention.

FIG. 7 is a flowchart illustrating operation of a key update method according to an embodiment of the present invention.

Referring to FIG. 7, in operation S710, the key update method, with respect to a member which has switched from an offline mode to an online mode, according to the embodiment of the present invention, stores data in a database of an update server, the data having encoded an updated node key in response to a node key update for a group.

In this case, the data, having an encoded updated node key, may be generated by encoding the updated node key into a child node key of the updated node.

Also, in operation S720, the key update method with respect to the member which has switched from the offline mode to the online mode, according to the embodiment of the present invention, selects necessary data, from among the data having the encoded updated node key, to calculate a key immediately prior to when the member is switched to the online mode, and generates member update data.

In this case, the update server may select to download the necessary data from a device corresponding to the member which has switched from the offline mode to the online mode, and the update server may download all update data and select the necessary data for the device.

Also, in operation S730, the key update method corresponding to the member which has switched from the offline mode to the online mode, according to the embodiment of the present invention, performs a key update with respect to the member using the member update data in the device corresponding to the member which has switched from the offline mode to the online mode.

In this case, the key update method, corresponding to the member which has switched from the offline mode to the online mode, according to the embodiment of the present invention, may further include downloading the member update data from the update server in the device corresponding to the member.

Figure 8:
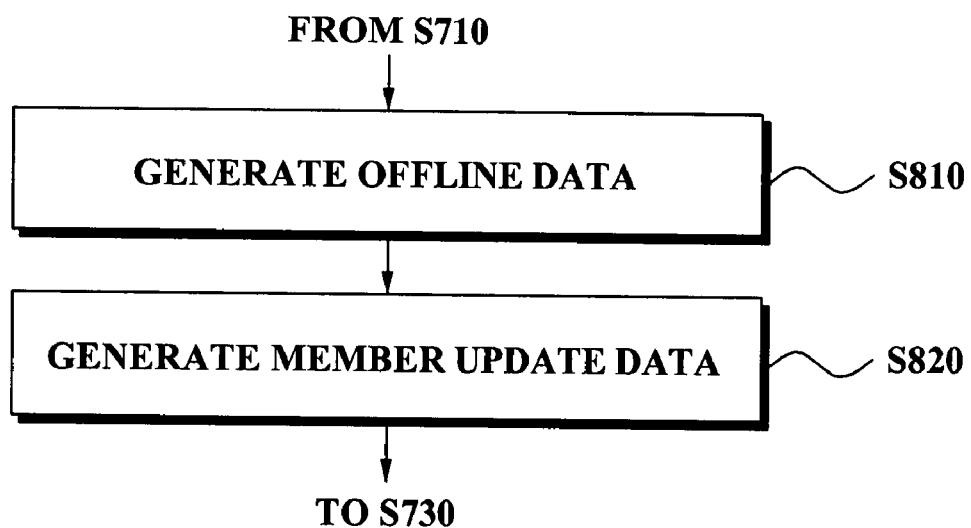
FIG. 8 is a flowchart illustrating the generating of the member update data of FIG. 7.

FIG. 8 is a flowchart illustrating the generating of the member update data of FIG. 7.

Referring to FIG. 8, in operation S810, operation S720 selects data corresponding to the node key update, which occurs after the member is in the offline mode, from the stored data having the encoded updated node key, and generates offline data.

Also, in operation S820, the generating of the member update data selects the necessary data for the key update with respect to the member from the offline data, and generates the member update data.

In this case, operation S820 may select the data from the offline data, the data having been encoded into a leaf node corresponding to the member or to an ancestor node key of the leaf node, and generate the member update data.

The key update method with respect to a member, which has switched from an offline mode to an online mode, according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 9:
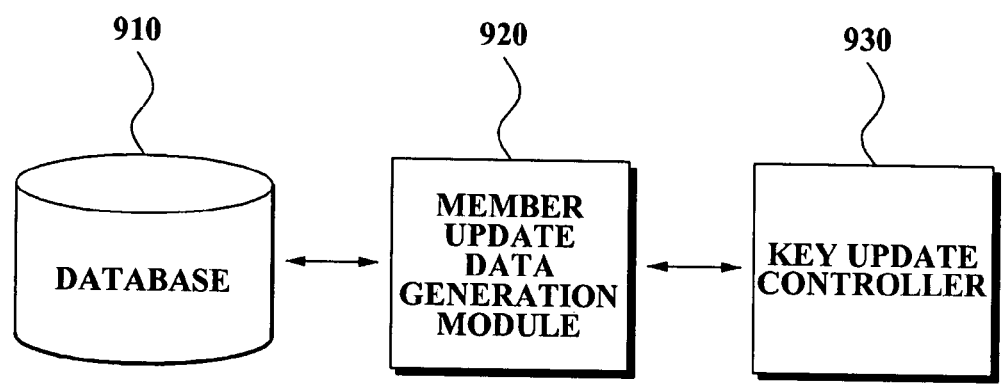
FIG. 9 is a block diagram illustrating a key update apparatus according to an embodiment of the present invention.

FIG. 9 is a block diagram illustrating a key update apparatus according to an embodiment of the present invention.

Referring to FIG. 9, the key update apparatus according to the embodiment of the present invention includes a database 910, a member update data generation module 920, and a key update controller 930.

The database 910 is equipped in a server and stores data, having an encoded updated node key in response to a node key update for a group.

In this case, the data having an encoded updated node key may be generated by encoding the updated node key into a child node key of the updated node.

The member update data generation module 920 selects necessary data among the data having the encoded updated node key in order to calculate a key immediately prior to when the member is switched to online, and generates member update data. In this case, the member update data generation module 920 may include an offline data generation module for selecting data which corresponds to the node key update, which occurs while the member is in the offline mode, from among the stored data which has encoded the updated node key, and generating offline data, and a member data generation module for selecting the necessary data for the key update with respect to the member from the offline data, and generating the member update data.

In this case, the member update data generation module 920 may select the data from the offline data, the data having been encoded into a leaf node corresponding to the member or to an ancestor node key of the leaf node, and generate the member update data.

The key update controller 930 performs a key update with respect to the member by providing the member update data to a device corresponding to the member which has switched from the offline mode to the online mode.

In this specification, a key update method in a group corresponding to a binary tree has been described, however as is apparent to those of ordinary skill in the art, the key update method is not be limited to the group corresponding to the binary tree. Namely, as long as update information during the offline mode is immediately downloaded via a wired/wireless Internet from a predetermined server after a device switches from an offline mode to an online mode, it is not contrary to the scope and spirit of the invention.

The key update method and key update apparatus of an exemplary embodiment of the present invention can effectively perform a key update for devices provided with information of an update while a device is in an offline mode.

Also, the key update method and key update apparatus of an exemplary embodiment of the present invention can effectively perform a key update using necessary update data for devices, which have switched from an offline mode to an online mode, to update their own key.

Also, the key update method and key update apparatus of and exemplary embodiment of the present invention can prevent leaking of a group key by providing update data in an encoded form from an update server.

While the invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A key update method for a member that has switched from an offline mode to an online mode, the method comprising:

storing, by an update server, data in a database of an update server, the data having an encoded updated node key in response to a node key update for a group;

selecting, by the update server, necessary data, from among the data having the encoded updated node key, to calculate a key immediately prior to when the member is switched to the online mode, and generating member update data; and providing the member update data to a device corresponding to the member which has switched from the offline mode to the online mode, wherein, the member update data is used in performing a key update with respect to the member, and when a node joins the group, the data having the encoded updated node key is generated by encoding an ancestor node key other than a root node key, corresponding to the ancestor node of the node that joins the group, into a child node key.

2. The method of claim 1, wherein the generating of the member update data comprises:

selecting, by the update server, data that corresponds to the node key update, which occurs while the member is in the offline mode, from among the stored data having encoded the updated node key, and generating offline data; and selecting, by the update server, the necessary data for the key update with respect to the member from the offline data, and generating the member update data.

3. The method of claim 2, wherein the selecting of the necessary data for the key update with respect to the offline data member includes selecting the data from the offline data which has been encoded into a leaf node corresponding to the member or to an ancestor node key of the leaf node, and generating the member update data.

4. A non-transitory computer-readable recording medium for storing a program for implementing a key update with respect to a member which has switched from an offline mode to an online mode, the medium comprising:
- a first set of instructions for storing data in a database of an update server, the data having an encoded updated node key in response to a node key update for a group;
- a second set of instructions for selecting necessary data, from among the data having the encoded updated node key, to calculate a key immediately prior to when the member is switched to the online mode, and generating member update data; and
- a third set of instructions for transmitting the member update data to a device corresponding to the member which has switched from the offline mode to the online mode,
- wherein the member update data is used in performing a key update with respect to the member which has switched from the offline mode to the online mode, and when a node joins the group, the data having the encoded updated node key is generated by encoding an ancestor node key other than a root node key, corresponding to the ancestor node of the node that joins the group, into a child node key.

5. A key update apparatus with respect to a member, which has switched from an offline node to an online mode, the apparatus comprising:
- a memory for storing data that has an encoded updated node key, in response to a node key update for a group;
- a member update data generation module for selecting necessary data from among the data having the encoded updated node key, to calculate a key immediately prior to when the member is switched to the online mode, and generating member update data; and
- a key update controller for providing the member update data to a device corresponding to the member which has switched from the offline mode to the online mode,
- wherein, the member update data is used in performing a key update with respect to the member, and when a node joins the group, the data having the encoded updated node key is generated by encoding an ancestor node key other than a root node key, corresponding to the ancestor node of the node that joins the group, into a child node key.

6. The apparatus of claim 5, wherein the member update data generation module comprises:
- an offline data generation module for selecting data that corresponds to the node key update, which occurs while the member is in the offline mode, from among the stored data which has the encoded updated node key, and generating offline data; and
- a member data generation module for selecting the necessary data for the key update with respect to the member from the offline data, and generating the member update data.

7. The apparatus of claim 6, wherein the member data update generation module selects the data from the offline data, the data having been encoded into a leaf node corresponding to the member or to an ancestor node key of the leaf node, and generates the member update data.

* * * * *